US012681562B2

(12) United States Patent
Zhang et al.

(10) Patent No.: US 12,681,562 B2
(45) Date of Patent: Jul. 14, 2026

(54) BODY FAT SCALE

(71) Applicant: Anker Innovations Technology Co., Ltd., Changsha (CN)

(72) Inventors: Feng Zhang, Shenzhen (CN); Wei Ding, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 18/762,958

(22) Filed: Jul. 3, 2024

(65) Prior Publication Data

US 2025/0013288 A1     Jan. 9, 2025

(30) Foreign Application Priority Data

Jul. 5, 2023     (CN) .......................... 202310820088.0

(51) Int. Cl.
| | |
|---|---|
| *G06F 3/01* | (2006.01) |
| *G01G 19/50* | (2006.01) |
| *G01G 23/36* | (2006.01) |
| *G06F 3/0483* | (2013.01) |

(52) U.S. Cl.
CPC ............. *G06F 3/011* (2013.01); *G01G 19/50* (2013.01); *G01G 23/36* (2013.01); *G06F 3/017* (2013.01); *G06F 3/0483* (2013.01)

(58) Field of Classification Search
CPC ........ G06F 3/011; G06F 3/017; G06F 3/0483; G06F 1/3231; G06F 1/3265; G06F 1/3287; G06F 3/0482; G06F 3/04842; G06F 3/0488; G01G 19/50; G01G 23/36
See application file for complete search history.

(56) References Cited

U.S. PATENT DOCUMENTS

| | | | | | |
|---|---|---|---|---|---|
| 5,720,296 | A | * | 2/1998 | Cha ...................... | A61B 5/0537 |
| | | | | | 600/372 |
| 5,750,937 | A | * | 5/1998 | Johnson ............. | G01G 23/3707 |
| | | | | | 178/18.05 |
| D424,191 | S | * | 5/2000 | Sarrazin ...................... | D24/107 |
| 6,292,690 | B1 | * | 9/2001 | Petrucelli ................. | A61B 5/05 |
| | | | | | 600/547 |

(Continued)

FOREIGN PATENT DOCUMENTS

| | | | |
|---|---|---|---|
| JP | 48-036734 B | 11/1973 |
| JP | 0736612 B | 7/1974 |

(Continued)

OTHER PUBLICATIONS

Oct. 1, 2025—(JP) First Office Action—App. No. 2024-108933 w/ Eng. Translation.

(Continued)

*Primary Examiner* — Benyam Ketema
(74) *Attorney, Agent, or Firm* — Banner & Witcoff, Ltd.

(57) ABSTRACT

The present application discloses a method of controlling a user display interface of a body fat scale and a body fat scale, the control method comprising: recognizing a foot action of a user in a wake-up state; and controlling a user display interface of the body fat scale based on the foot action. By the above method, the present application is able to improve the convenience of controlling the user display interface of the body fat scale by the user, so as to improve the convenience of interactive operation between the user and the body fat scale.

21 Claims, 12 Drawing Sheets

Recognizing foot action of a user in a wake-up state    11

Control a user display interface of a body fat scale based on the foot action    12

(56) References Cited

U.S. PATENT DOCUMENTS

| | | | | |
|---|---|---|---|---|
| 6,369,337 B1* | 4/2002 | Machiyama | G01G 23/3728 | 177/245 |
| 6,473,643 B2* | 10/2002 | Chai | A61B 5/05 | 600/547 |
| 6,487,445 B1* | 11/2002 | Serita | A61B 8/0858 | 600/587 |
| 6,516,221 B1* | 2/2003 | Hirouchi | A61B 5/0537 | 600/547 |
| 6,538,215 B2* | 3/2003 | Montagnino | G01G 19/4146 | 177/25.19 |
| 6,621,013 B2* | 9/2003 | Tanida | A61B 5/1171 | 340/5.82 |
| 6,734,856 B2* | 5/2004 | Ishikawa | A61B 5/4872 | 600/300 |
| 6,886,746 B1* | 5/2005 | Edwards | G07G 1/0054 | 235/383 |
| 7,186,930 B1* | 3/2007 | Wong | G01G 19/44 | 177/25.19 |
| 7,962,205 B2* | 6/2011 | Okura | A61B 5/107 | 117/1 |
| 9,568,354 B2* | 2/2017 | Kovacs | A61B 5/0245 | |
| 10,215,619 B1* | 2/2019 | Kovacs | G01G 19/50 | |
| 10,228,276 B2* | 3/2019 | Zhao | G01G 21/23 | |
| D897,226 S * | 9/2020 | Jiang | D10/92 | |
| 11,280,592 B2* | 3/2022 | Hong | F41J 3/0014 | |
| 11,561,123 B2* | 1/2023 | Serval | G01G 19/50 | |
| 11,633,154 B2* | 4/2023 | Fornell | G01G 3/13 | 600/301 |
| 2001/0011043 A1* | 8/2001 | Ishikawa | A61B 5/4872 | 473/319 |
| 2002/0027439 A1* | 3/2002 | Shoji | A61B 5/4872 | 324/715 |
| 2002/0062090 A1* | 5/2002 | Chai | A61B 5/0537 | 600/547 |
| 2005/0113712 A1* | 5/2005 | Petrucelli | A61B 5/0537 | 324/692 |
| 2008/0073128 A1* | 3/2008 | Umemoto | G01G 19/50 | 177/5 |
| 2008/0146961 A1* | 6/2008 | Okura | A61B 5/4872 | 600/587 |
| 2008/0281222 A1* | 11/2008 | Fukada | A61B 5/4872 | 702/1 |
| 2010/0103093 A1* | 4/2010 | Izumi | G06F 3/0334 | 345/156 |
| 2010/0210921 A1* | 8/2010 | Park | A61B 5/6829 | 600/301 |
| 2013/0102268 A1* | 4/2013 | Wang | H04M 1/72457 | 455/343.2 |
| 2013/0310700 A1* | 11/2013 | Wiard | A61B 5/318 | 600/500 |
| 2014/0035888 A1* | 2/2014 | Levasseur | A63F 13/214 | 345/184 |
| 2014/0142396 A1* | 5/2014 | Ricks | G16H 40/67 | 600/301 |
| 2015/0149216 A1* | 5/2015 | Suzuki | G16H 15/00 | 705/3 |
| 2015/0160068 A1* | 6/2015 | Carreel | G01G 3/1404 | 177/1 |
| 2015/0201884 A1* | 7/2015 | Ashokan | A61B 5/6898 | 702/19 |
| 2015/0296273 A1* | 10/2015 | Kim | H04N 21/4781 | 725/32 |
| 2015/0338265 A1* | 11/2015 | Carreel | G01G 19/50 | 177/1 |
| 2015/0362360 A1* | 12/2015 | Kovacs | A61B 5/0295 | 177/245 |
| 2016/0299001 A1* | 10/2016 | Petrucelli | A61B 5/0537 | |
| 2017/0211968 A1* | 7/2017 | Kovacs | A61B 5/0535 | |
| 2020/0355545 A1* | 11/2020 | Hennes | A47K 3/405 | |
| 2021/0020069 A1* | 1/2021 | Komala | G01L 5/00 | |
| 2021/0297766 A1* | 9/2021 | Bai | H04R 1/1091 | |
| 2023/0157565 A1* | 5/2023 | Zhao | A61B 5/0537 | 600/547 |
| 2024/0337523 A1* | 10/2024 | Fornell | G01G 19/44 | |

FOREIGN PATENT DOCUMENTS

| | | |
|---|---|---|
| JP | 2004-230163 A | 8/2004 |
| JP | 2005-237473 A | 9/2005 |
| JP | 2016-007372 A | 1/2016 |
| WO | 2013/069109 A1 | 5/2013 |

OTHER PUBLICATIONS

Jan. 1, 20269—(JP) Second Office Action—App. No. 2024-108933 w/ Eng. Translation.

* cited by examiner

91

100

BODY FAT SCALE

The present application claims priority to CN application No. 202310820088.0, filed on Jul. 5, 2023. The above application is incorporated by reference in its entirety.

FIELD

The present application relates to the technical field of measuring devices, and in particular to a method of controlling a user display interface of a body fat scale, and a body fat scale.

BACKGROUND

As times have evolved and at the advent of the era of healthy consumption, people's demands for weight scales are no longer limited to just measuring weight. With a deeper understanding of health knowledge, body fat percentage has become an important indicator for individuals pursuing health to to monitor their own health levels. Therefore, there is an increasing demand for body fat scales.

In related technologies, bioelectrical impedance analysis (BIA) is commonly used to measure body fat content. BIA essentially involves releasing a weak electric current through electrodes, which is then conducted through the body to measure impedance and calculate body fat. For example, with a body fat scale, users only need to stand barefoot on the scale's electrode area on the face of the scale to complete a body fat test.

In the traditional technology, users need to carry their mobile phones with them when using the body fat scale, and it is not convenient to confirm the user information or view the measurement data through a mobile application.

SUMMARY

The present application provides a method of controlling a user display interface of a body fat scale, and a body fat scale, in order to solve the above technical problems.

One technical solution adopted in the present application is to provide a control method, the method comprising: recognizing a foot action of a user in a wake-up state of a body fat scale; controlling a user display interface of the body fat scale based on the foot action.

Wherein the body fat scale is provided with a motion detection sensor to identify the user's foot action, the method comprising: obtaining motion information about the user's foot action associated with the body fat scale by the motion detection sensor; identifying the user's foot action based on the motion information.

Wherein the motion detection sensor comprises a vibration sensor, the motion information comprises vibration information, and the user's motion information on the body fat scale is obtained via the motion detection sensor, the method including: obtaining the vibration information via the vibration sensor.

Wherein the vibration information comprises a vibration change amount, and identifying a foot action of the user based on the motion information comprises: determining that the foot action is generated when the vibration change amount is greater than or equal to a vibration sensitivity value; and determining a type of the foot action.

Wherein determining the type of the foot action comprises: determining a number of footsteps or a foot-strike count, the number of footsteps or the foot-strike count being a number of foot actions generated within a predetermined time duration; determining, based on the foot-strike count, that the foot action is a single click action or a combo click action.

Wherein determining the type of the foot action comprises: determining that the foot action is a combo click action when an interval duration between two adjacent foot actions generated is less than or equal to an interval threshold.

Wherein determining the type of the foot action comprises: obtaining a duration of sustained heavy pressing of the foot action; determining, based on the duration of sustained heavy pressing, whether the foot action is a long press action or a short press action.

Wherein determining the type of the foot action comprises: obtaining an action region in which the foot action is generated; determining, based on the action region, that the user's foot action is a left foot action and/or a right foot action.

Wherein the operation of the user display interface includes at least one of operation comprising: determining a current page in the user display interface, providing a switching option on the current page in the user display interface, and performing a page switching operation on the user display interface.

Wherein the display content of the user display interface includes at least one of the following: charts of detection results of body fat, body weight, and muscle weight; corresponding graphs of the body fat, the body weight, and the muscle weight; comparison graphs of any two or more of parameters including the body fat, the body weight, and the muscle weight; and basic information of the user.

Wherein the control method further comprises: controlling the user display interface to automatically perform page switching if the foot action is not recognized within a preset time period.

Wherein, before recognizing the user's foot action in the wake-up state, the control method further comprises: causing the body fat scale to enter the wake-up state and determining a control mode; when the control mode is a foot control mode, performing the step of recognizing the user's foot action in the wake-up state; and when the control mode is an automatic control mode, controlling the user display interface of the body fat scale based on a preset time interval.

Wherein, prior to recognizing the user's foot action, the control method further comprises: determining that the user is standing with both feet on the body fat scale and causing the body fat scale to enter the wake-up state.

Wherein determining that the user's feet stand on the body fat scale comprises: obtaining an amount of weight change of the user; and, in response to the amount of weight change being within a predetermined range, determining that the user is standing with both feet on the body fat scale.

Wherein recognizing the user's foot action in the wake-up state comprises: causing the body fat scale to enter the wake-up state and activating the user display interface; and recognizing the user's foot action when the user display interface is in a display state.

In order to solve the above technical problem, another technical solution adopted in the present application is: to provide a body fat scale, which includes a housing, provided with a display screen or a projection device, the display screen configured for displaying a user display interface, and the projection device configured for projecting the user display interface; and a processor, provided in the housing and configured for recognizing a user's foot action in a wake-up state of the body fat scale, and controlling the user display interface based on the foot action.

Wherein the body fat scale further comprises: a motion detection sensor, provided in the housing and coupled to the processor, the motion detection sensor being used to obtain motion information about the user's foot action of the user in the housing, and the processor configured for determining the user's foot action based on the motion information.

Wherein the motion detection sensor includes a vibration sensor, the motion information includes vibration information, and the vibration sensor acquires vibration information of the housing.

Wherein the vibration sensor includes one or more of an acceleration sensor, a velocity sensor, a displacement sensor, and a force sensor.

Wherein, the housing is provided with a foot action region and a display region, the user display interface is displayed in the display region, and the motion detection sensor is provided in the foot action region, wherein the foot action region does not overlap with the display region.

Wherein the foot action region comprises an optimal foot region, wherein a distance between a left side of the optimal foot region and a left side of the housing, and a distance between a right side of the optimal foot region and a right side of the housing are greater than a distance threshold; and wherein a difference in a distance between the left side of the optimal foot region and the right side of the optimal foot region and a distance between the feet of the user when the user is standing naturally is less than the distance threshold; and wherein a regional sensitivity of the optimal foot region is greater than a regional sensitivity of other regions of the foot action region.

The beneficial effect of the present application is as follows: in contrast with the prior art, the present application provides a control method applied to a body fat scale, wherein the body fat scale recognizes a user's foot action in a wake-up state; and the user display interface of the body fat scale is controlled based on the foot action. In the above manner, when compared with the conventional control method of the body fat scale, the method of the present disclosure recognizes the user's foot actions and controls the user display interface of the body fat scale through the user's foot actions, thereby simplifying the user's control operation of the user display interface of the body fat scale, enabling the user to independently view the measurement data without downloading an application on a mobile device, simplifying the user's operation and making it easier for the user to interact with the body fat scale.

BRIEF DESCRIPTION OF THE DRAWINGS

In order to more clearly illustrate the technical solutions in the examples of the present application, the accompanying drawings to be used in the description of the examples will be briefly introduced below, and it is obvious that the accompanying drawings in the following description are only some of the examples of the present application, and for the person of ordinary skill in the field, other accompanying drawings can be obtained according to these drawings without creative labor. Among them.

BRIEF DESCRIPTION

The technical solutions in the examples of the present application will be described clearly and completely in the following in conjunction with the accompanying drawings in the examples of the present application, and it is obvious that the described examples are only a part of the examples of the present application, and not all of the examples. Based on the examples in this application, all other examples obtained by a person of ordinary skill in the art without making creative labor fall within the scope of protection of this application.

The term "and/or" in this paper is merely a description of the association relationship of the associated objects, indicating that there can be three kinds of relationships, for example, A and/or B, which can be expressed as: the existence of A alone, the existence of A and B at the same time, and the existence of B alone. In addition, the character "/" in the present document generally indicates that the associated objects before and after are in an "or" relationship. In addition, the term "more" herein denotes two or more than two. In addition, the term "at least one" herein denotes any one of the plurality or any combination of at least two of the plurality, for example, including at least one of A, B, and C, and may denote including any one or more elements selected from a set composed of A, B, and C.

The control method provided in the present application is mainly applied to a related weighing device such as a body fat scale, wherein the body fat scale recognizes a user's footsteps and facilities a user's control of a user display interface of the body fat scale based on the footsteps.

At present, the user control of the body fat scale mainly includes downloading a corresponding APP (e.g., an application) to the mobile phone from the official website based on the type of body fat scale, and using the app to control the scale. Users can only view various measured data autonomously through the APP or perform simple operations like turning the scale on or off using the buttons on the scale. However, more specific control operations cannot be achieved. Therefore, when using the existing control method to manage the user display interface of the body fat scale, the user cannot operate the user display interface directly through the physical gestures. Instead, they need to download the APP and use their mobile phones for operation, which increases the complexity of the interaction process, greatly increases barrier of using the body fat scale, and negatively impacts the user experience. Based on this, the present application provides a method for controlling a user display interface of a body fat scale. The technical solutions adopted in the present application are described in detail below.

Figure 1:
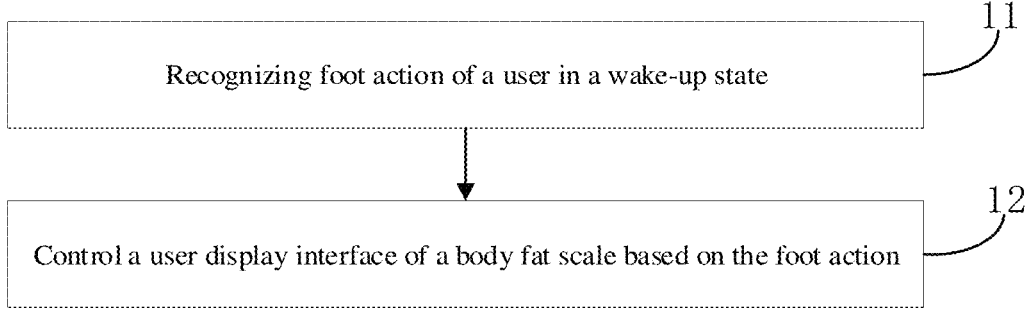
FIG. 1 is a flowchart of an example of a control method of a user display interface of a body fat scale provided in the present application.

Referring to FIG. 1, FIG. 1 is a flow diagram of an example of a control method of a user display interface of a body fat scale provided by the present application.

Step 11: Recognizing the user's foot actions in the wake-up state.

Specifically, the body fat scale enters the wake-up state by determining that both of the user's feet are standing on the body fat scale. For example, after the body fat scale is powered on, it is determined whether both feet of the user are standing on the body fat scale, and if both feet of the user are standing on the body fat scale, the body fat scale enters the wake-up state; in the wake-up state, the user can control the user display interface of the body fat scale by his/her foot actions. The present example, by going to recognize the user's foot actions in the wake-up state, the method can avoid some mis-operation or detection generated when an object falls onto the body fat scale.

Wherein the wake-up state indicates that the body fat scale is currently in a standby working state, and the processor of the body fat scale is running and is able to receive instructions and then carry out corresponding operations.

Optionally, the body fat scale sends a safety current through an object (e.g., a person) to measure the resistance of the object after the body fat scale acquires that there is an amount of weight change. If the resistance is within a predetermined resistance magnitude or range, it is confirmed that a human is standing on the body fat scale. Thereby, a situation where an object of similar weight to the human falls onto the body fat scale and causes false detection is further avoided. The determined resistance magnitude or range may be set before the body fat scale is shipped from the factory based on the average resistance range of the human body.

In an example of the present application, the body fat scale acquires an amount of weight change of the user; in response to the amount of weight change being within a preset range, it is determined whether the user's feet stand on the body fat scale. The preset range may be set before leaving the factory, or it may be set on the user's own needs, such as the user's actual weight, and is not limited herein. The present example determines whether the user's feet are standing on the body fat scale through the amount of change in the user's body weight to enter the wake-up state, which can avoid false touch interference caused by the user touching the body fat scale with a single foot or placing other objects on the body fat scale, and can improve the accuracy of the control of the body fat scale entering the wake-up state.

After entering the wake-up mode, the body fat scale will turn on the user display interface and recognize the user's foot actions when the user display interface is in a display state. In this way, the body fat scale first turns on the user display interface so that the user display interface is initialized or activated before recognizing the user's foot actions, which facilitates the user to control the user display interface based on the contents of the user display interface. This not only improves the user's experience, in particular for a novice user of the body fat scale, but also improves the accuracy of the control of the user display interface.

Optionally, the body fat scale is provided with a display screen or the like, and the user display interface can be displayed via the display screen. Alternatively, a projection device may also be provided at the body fat scale, and after the body fat scale enters the wake-up mode, the body fat scale controls the projection device to project the user display interface on a projection bearing area, such as a floor, a wall, etc.

Figure 2:
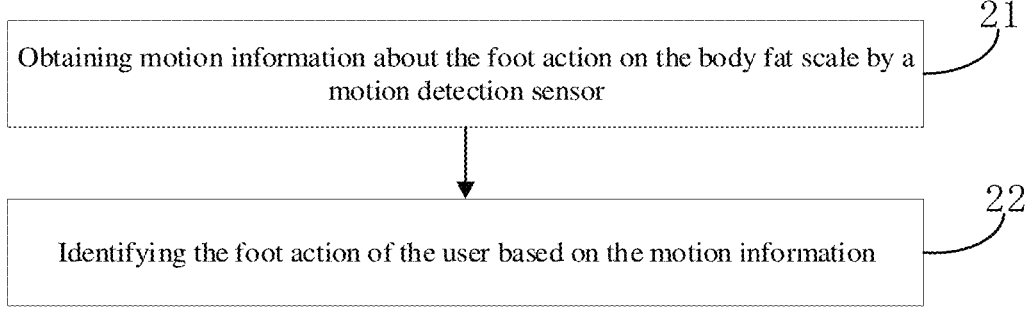
FIG. 2 is a flow diagram of an example of step 11 of a method for controlling a user display interface of a body fat scale provided in the present application.

Optionally, the body fat scale is provided with a motion detection sensor, and the present example may implement step 11 by a method as shown in FIG. 2. The method of the present example comprises step 21 and step 22.

Step 21: Obtaining motion information about the user's foot action on the body fat scale by means of a motion detection sensor.

Specifically, the motion detection sensor comprises a vibration sensor, the motion information comprises vibration information, and obtaining motion information about the user's foot action on the body fat scale via the motion detection sensor comprises: obtaining vibration information via the vibration sensor.

Specifically, a vibration sensor is a device or element that measures the vibration of an object. The principle is to determine the vibration state of an object by detecting small displacement or velocity changes on the surface of the object due to vibration. The vibration sensor includes an acceleration sensor, a piezoelectric sensor, and a laser interferometer. When a user produces a foot action on the body fat scale, the user will step on the body fat scale, causing the body fat scale to vibrate, and the body fat scale in this example can accurately obtain information about the user's action on the body fat scale by means of the vibration sensor.

In an example of the present application, the vibration sensor may be an acceleration sensor, and the body fat scale obtains the vibration information of the body fat scale through the acceleration sensor. An acceleration sensor is a sensor that detects vibration by measuring the acceleration of an object. Acceleration sensors are usually made of microelectromechanical systems (MEMS) and their operating principle is based on Newton's second law. When an object vibrates, the acceleration sensor measures the acceleration of the object to calculate the characteristic parameters of the object's vibration, i.e. the vibration information.

In an example of the present application, the vibration sensor may be a piezoelectric sensor. A piezoelectric vibration sensor is a sensor that converts mechanical vibrations into electrical signals, and its operating principle is based on the piezoelectric effect. The piezoelectric effect refers to the phenomenon that certain crystalline materials, when subjected to mechanical stress, produce an uneven distribution of charge, thereby generating a potential difference. Using this effect, the mechanical vibration of an object can be converted into an electrical signal, thus enabling vibration detection and measurement. Piezoelectric vibration sensors are usually made of piezoelectric ceramic materials, and their structure includes vibration sensitive elements, signal amplifiers, filters, microprocessors and output interfaces. When an object vibrates, the vibration-sensitive element produces a small uneven charge distribution, which generates a weak electrical signal. The signal amplifier amplifies this weak electrical signal, the filter filters out noise and interference signals, and the microprocessor digitally processes and analyses the signal to extract useful parameters of the vibration characteristics. Finally, the output interface will output an analogue voltage signal or a digital signal for connection to a data acquisition system or control system. Piezoelectric vibration sensors have the advantages of high sensitivity, high accuracy and low power consumption, and are suitable for measuring tiny vibration signals. They are widely used in vibration monitoring and fault diagnosis of mechanical equipment, vibration monitoring and safety assessment of structures, acoustic vibration monitoring and non-contact measurement.

Step 22: Identify the foot action of the user based on the motion information.

Figure 3:
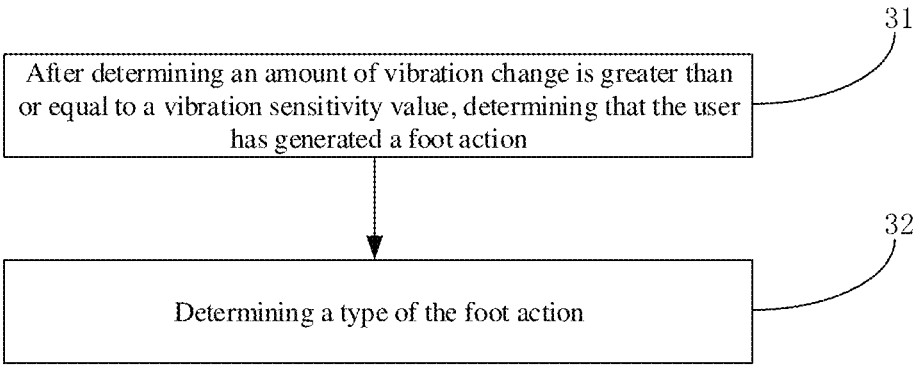
FIG. 3 is a flow diagram of an example of step 22 of a method for controlling a user display interface of a body fat scale provided in the present application.

The body fat scale recognizes a foot action of a user based on vibration information. Specifically, the vibration information includes the amount of vibration change, and the present example may implement step 22 by a method as shown in FIG. 3. The method of the present example includes step 31 and step 32.

Step 31: When the amount of vibration change is greater than or equal to the vibration sensitivity value, then it is determined that the user has generated a foot action.

When the body fat scale acquires that the amount of vibration change is greater than or equal to the vibration sensitivity value, it is determined that the user has produced a foot action.

Specifically, the vibration sensitivity value is used by the body fat scale to determine whether the acquired amount of vibration change is a user-generated threshold value of the amount of vibration change, and the manner of acquiring the vibration sensitivity value may be achieved by means of user input or import or obtained by extracting it from a database of the body fat scale. Exemplarily, the vibration sensitivity value may be pre-stored in the database of the body fat scale, and the body fat scale is able to obtain the vibration sensitivity value by calling the database. Of course, the vibration sensitivity may also be user-imported, and the user may pre-collect the vibration sensitivity value and then import it into the body fat scale. Therefore, there are many ways on how to obtain the vibration sensitivity value, and no specific limitation is made herein.

Step 32: Determine the type of the foot action.

The body fat scale further determines the type of action based on the recognized foot action of the user to determine the specific operation of the user display interface, so as to facilitate the body fat scale to control the user display interface switching, etc. The body fat scale can pre-store or set by the user the mapping relationship between the type of foot action and the user display interface. The body fat scale may pre-store or set by the user a mapping relationship between the foot action type and the specific operation of the user display interface, and different users may set the mapping relationship based on their own operating habits, which enables personalized control of the user display interface, improves the user experience, and improves the efficiency of the user's control of the user interface because the user sets the mapping relationship based on his or her own operating habits.

In an example of the present application, the body fat scale determines the number of footsteps, the number of footsteps being the number of foot actions generated within a preset duration; based on the number of footsteps, it is determined that the user's foot action is a single click action or a continuous click action (e.g., a combo click action). Wherein, the preset time duration can be set before leaving the factory, or can be set by the user according to the user's needs, and is not limited herein.

The body fat scale continuously detects vibration information and determines a number of foot actions based on the amount of vibration change. A minimum value of the amount of vibration change during a single click action is greater than or equal to a threshold value, where a difference between the sensitivity and the threshold value is a vibration fluctuation value of the body fat scale during the single click action.

For example, when the preset duration is 2 s (e.g., two seconds), if the body fat scale acquires that the user has generated multiple (multiple includes two and more) foot actions within 2 s, the current foot action of the user is considered to be a consecutive click action (e.g., a combo click action), and if the body fat scale acquires that the user has generated one foot action within 2 s, the current foot action of the user is considered to be a single click action.

In an example of the present application, the body fat scale determines that the foot action is a combo click action in response to the fact that the length of the interval between two adjacent foot actions generated by the user is less than or equal to the interval threshold. The interval threshold may be set before leaving the factory or may be set by the user according to the user's needs, and is not limited herein.

For example, when the interval threshold is 2 s, if the body fat scale acquires that the user has generated a foot action, and there is no other foot action within 2 s, the foot action is considered to be a single click action, and the single click action may be applied to the switching of pages in the user display interface of the body fat scale by the user, so as to facilitate the user to view the corresponding curves or graphs of his/her own body fat, body weight, and muscle weight, or the detection of body fat, body weight, and muscle weight The single click action can be used to switch the pages in the user interface of the body fat scale to facilitate the user to view the corresponding graphs of his/her body fat, body weight and muscle weight, or the test results of body fat, body weight and muscle weight.

If the body fat scale obtains that the user has generated two foot actions, and the interval between the two adjacent foot actions is 1 s, the foot action is considered to be a double-tap action, and the double-tap action can be applied to the user's confirmation of the options or body data in the user display interface of the body fat scale; because the switching or confirming requires a shorter operation length, it can not only be distinguished from other operations, but also improve the efficiency of the user display interface control. The double-tap action can be applied to the user's confirmation of options or body data in the user interface of the body fat scale.

If the body fat scale acquires that the user has generated three foot motions, and the interval time between two adjacent foot motions in the three foot motions is 3 s, the acquired foot motions are considered to be three-hit motions, and the three-hit motions can be applied to fast switching of the user, and the three-hit motions are used to realize fast switching of the page in the display interface of the user, which is able to reduce false touches.

According to the user's different times of foot actions to correspond to different types of action, in order to carry out different control operations on the user display interface, only through the number of foot actions can identify the type of foot action, which can reduce the difficulty of identifying the type of foot action, and improve the accuracy and efficiency of the control of the user display interface.

In an example of the present application, the body fat scale obtains a duration of sustained heavy pressing of a foot action; and determines, based on the duration of the sustained heavy pressing, whether the user's foot action is a long press action or a short press action.

Wherein, when the duration of sustained heavy pressing is greater than or equal to a preset foot-pressing duration, the user's foot action is considered to be a long press action, and when the duration of sustained heavy pressing is smaller than the preset foot-pressing duration, the user's foot action is considered to be a short press action. The preset foot-pressing duration can be set before leaving the factory, or it can be set on the user's own according to the user's needs, and is not limited herein.

Wherein the sustained heavy pressing refers to the user's foot stepping on the body fat scale without loosening and continuously applying pressure to the body fat scale, in order to avoid recognizing even the user's mere placing of his/her foot on the body fat scale as a foot action, thereby mistakenly recognizing a multiple stepping action as a single foot action, and thus, to improve the accuracy of the foot action recognition.

For example, when the preset foot-pressing duration is 3 s, when the body fat scale acquires that the duration of the user's foot pressing is 4 s, the foot pressing action is considered as a long pressing action, and the long pressing action can be applied to the user's switching off of the body fat scale, because the switching off operation usually needs to last a few seconds in order to filter out the misuse of the scale, and when the duration of the user's foot pressing is 2 s, the foot pressing action is considered as a short pressing action, and the short pressing action can be applied to the user's selection of pages or options in the user display interface, because the switching or options need shorter operation time, and not only can it be related to the switching or options. When the body fat scale acquires that the foot action of the user has a duration of $2s$, it is considered that the foot action is a short press action, and the short press action can be applied to the switching of pages or the selection of options in the user display interface of the body fat scale by the user, because the switching of pages or the selection of options requires a shorter operation duration, which not only can be differentiated from the switching off operation and so on, but also can improve the efficiency of the control of the user display interface.

In an example of the present application, the body fat scale acquires the vibration region that generates the foot action as an action region; and based on the action region, determines that the user's foot action is a left foot action and/or a right foot action.

For example, when the body fat scale acquires that the action region generating the foot action is the left scale of the body fat scale, and the vibration region changes from right to left, it is determined that the user's foot action is a left foot action, and the left foot action can be applied to the user switching the page or the option in the user display interface of the body fat scale to the next item in the operation interface; when the body fat scale acquires that the action region generating the foot action is the right scale surface of the body fat scale, and the When the vibration region changes from left to right, it is determined that the foot action of the user is a right foot action, and the right foot action may be applied to the user switching the page or option in the user display interface of the body fat scale to the operation interface of the next item.

The control effect corresponding to the foot action in the above examples is only an example, and the correspondence between the foot action and the control effect is not unique, and can be adjusted and replaced at the time of shipment from the factory or when the user uses the scale. In other examples, the user's foot action type can also be realized by other interactive actions and can be reflected by the user's foot actions on the weighing surface of the body fat scale, or by a combination of foot actions and other information.

Step 12: Control the user display interface of the body fat scale based on foot actions.

Specifically, after the body fat scale determines the action type of the foot action of the user, it also controls the user display interface of the body fat scale to perform a corresponding operation based on the type of the foot action. Wherein the operation includes at least one of: a determination operation of a current page in the user display interface, providing a switching option on the current page in the user display interface, and performing a page switching operation of the user display interface.

The correspondence between types of foot actions and operations on the user interface can be found above.

Specifically, the display content of the user display interface includes at least one of the following: a chart of the detection results of the body fat, the body weight, and the muscle weight; a graph of the corresponding curves of the body fat, the body weight, and the muscle weight; a graph comparing the curves of any two or more of the body fat, the body weight, and the muscle weight; and basic information of the user.

Figure 4:
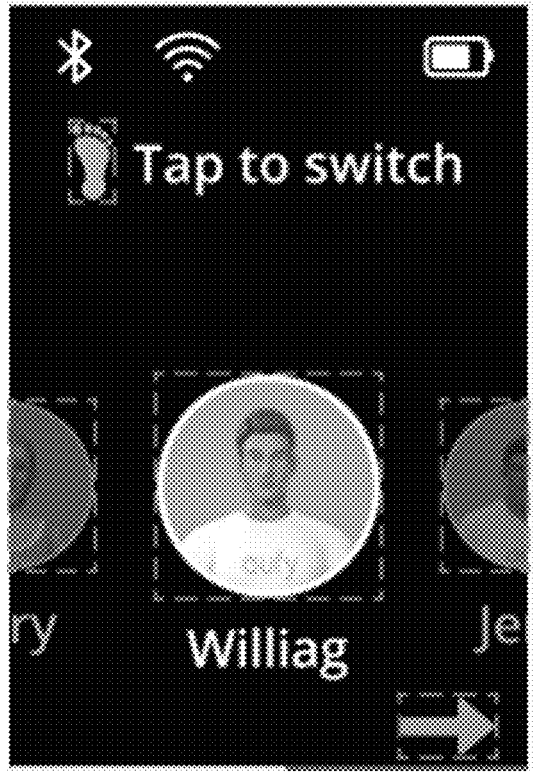
FIG. 4 is a schematic diagram of an interface of a first example of a user display interface of a body fat scale provided in the present application.

Referring to FIG. 4, FIG. 4 is a schematic diagram of an interface of a first example of a user display interface of a body fat scale provided by the present application. The user display interface includes basic information of a user, i.e., a user account, and each account includes a respective user avatar as well as a user name and the like. The user may perform a foot action on a foot action area set by the body fat scale to improve the accuracy of the foot action recognition, thereby allowing the body fat scale to acquire the type of the user's foot action to achieve a determination operation of a current page, provide a switching option of the current page in the display interface, and to complete the switching or selecting of the user account.

Figure 5:
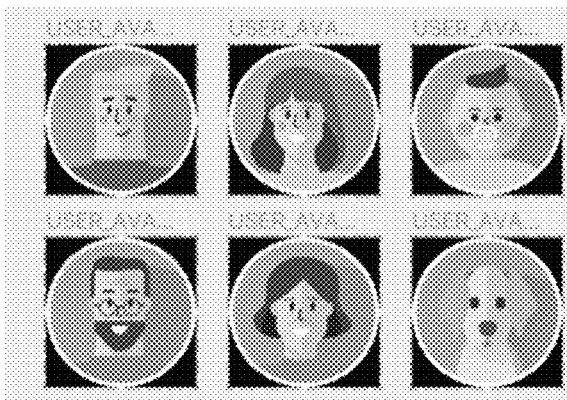
FIG. 5 shows a schematic diagram of an interface of a second example of a user display interface of a body fat scale provided in the present application.

Optionally, when the user uses the body fat scale, the user display interface of the body fat scale displays a prompt message of whether the user is a first-time user, and the user can select yes or no at the user display interface by a foot action, i.e., to realize the operation of determining the current page in the user display interface. If the user is a first-time user, i.e., the user display interface selects yes, the user display interface will provide an initialization registration interface for the user to register. In the initial registration, referring to FIG. 5, which is a schematic diagram of the interface of the second example of the user display interface of the body fat scale provided in the present application, the body fat scale may provide different avatars and the like for the user to choose, so as to realize the personalization of the user information to be set.

Figure 6:
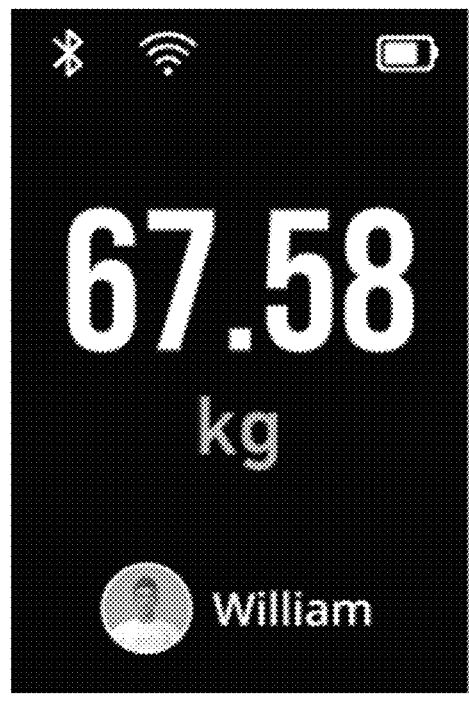
FIG. 6 is a schematic diagram of an interface of a third example of a user display interface of a body fat scale provided in the present application.

In another example of the present application, referring to FIG. 6, FIG. 6 is an interface schematic diagram of a third example of a user display interface of a body fat scale provided in the present application. After the user selects his or her user account through the user display interface displaying basic user information as shown in FIG. 4, the body fat scale displays the user's current body weight in the user display interface and displays it in bold capitals in the middle of the display interface for the user to confirm.

Figure 7:
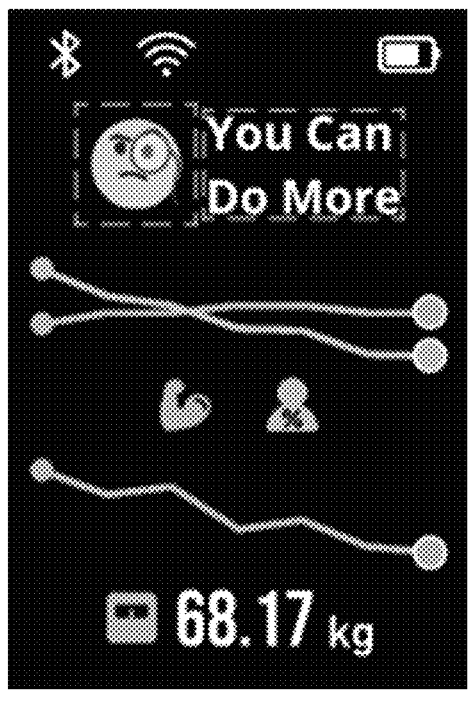
FIG. 7 is a schematic diagram of an interface of a fourth example of a user display interface of a body fat scale provided in the present application.

In another example of the present application, the content of the user display interface may include a curve graph corresponding to the user's body data, referring to FIG. 7, which is a schematic diagram of the interface of a fourth example of a user display interface of a body fat scale provided by the present application. The curve comparison graph may include three change curves of the user's weight, body fat, and muscle weight. By means of the changes in the curve comparison graph, the trend of changes in the user's body data can thus be determined, so as to facilitate the user to better know the changes in his/her body data and correspondingly adjust his/her fitness mode, life habits, etc. according to the changes.

Optionally, the curve comparison graph may also include two change curves of the user's body fat and weight. Through the changes in the curve comparison graph, thereby allowing the user to know the relationship between the changes in their body fat and their weight, allowing the user to focus not only on their weight, but also on the changes in their body fat, so as to target the adjustment of their body data from the diet, exercise, etc., to ensure that the user achieves the purpose of weight reduction in the case of physical health.

Optionally, the graph may further comprise a curve of change in body fat, by means of the changes in the graph, thereby enabling the user to visualize the changes to physical fitness achieved by him/her, for example, through fitness workouts.

Optionally, the curve comparison graph may also include two change curves of the user's heart rate and body fat, helping the user to understand in detail the relationship between his or her heart condition and body fat, thereby reminding the user that in order to ensure heart health needs to be will to keep the body fat rate at a normal level.

Optionally, after the display of the user display interface is finished with the curve comparison graph, it may also include personalized recommendation content for the user's living habits generated based on the user's body data such as the user's user weight, body fat, muscle weight, etc. For example, the display content of the user display interface may also include a recommended daily energy intake value for the user, a daily energy consumption value for the user's daily workout, a recommended daily water intake value for the user, a daily recommended exercise, and the like. The personalized recommendation content can help the user to achieve the purpose of weight loss and muscle building more reasonably according to their own body data.

Distinguishing from the situation of the prior art, the present application provides a control method applied to a body fat scale, wherein the body fat scale recognizes a foot action of a user in a wake-up state; and the user display interface of the body fat scale is controlled based on the foot action. In the above manner, compared with the conventional control method of the body fat scale, the method adopted in the present application of recognizing the user's foot action and thereby controlling the body fat scale can control the user display interface of the body fat scale through the user's foot action, thereby simplifying the user's control operation of the user display interface of the body fat scale, so that the user does not need to download the APP or crouch down to hold up the body fat scale in order to control the user display interface of the body fat scale, and thereby can simplify the user's control operation of the user display interface of the body fat scale. It can improve the convenience of the user's control of the user display interface of the body fat scale, and thus enables the user to interact with the body fat scale more conveniently.

In an application scenario, a body fat scale recognizes that a user is standing on the body fat scale with both feet, enters a wake-up state, and then opens a user display interface. In the current page, the body fat scale acquires vibration information of the user on the body fat scale, and when it is determined that the user's foot action is a single click action, it controls the switching of options in the current page; if it is determined that the user's foot action is a combo click action, it controls the determination of the options or the user's body data in the current display interface; if it is determined that the user's foot action is a single click action, it controls the switching of the current page to other pages; if it is determined that the If it is determined that the user's foot action is a long-press action, it controls the switching off of the body fat scale.

Of course, in other application scenarios, the correspondence between the type of footstep action and the operation of the user display interface can be set according to the user's own operating habits, or other types of footstep actions and operations can be added, without limitation.

Figure 8:
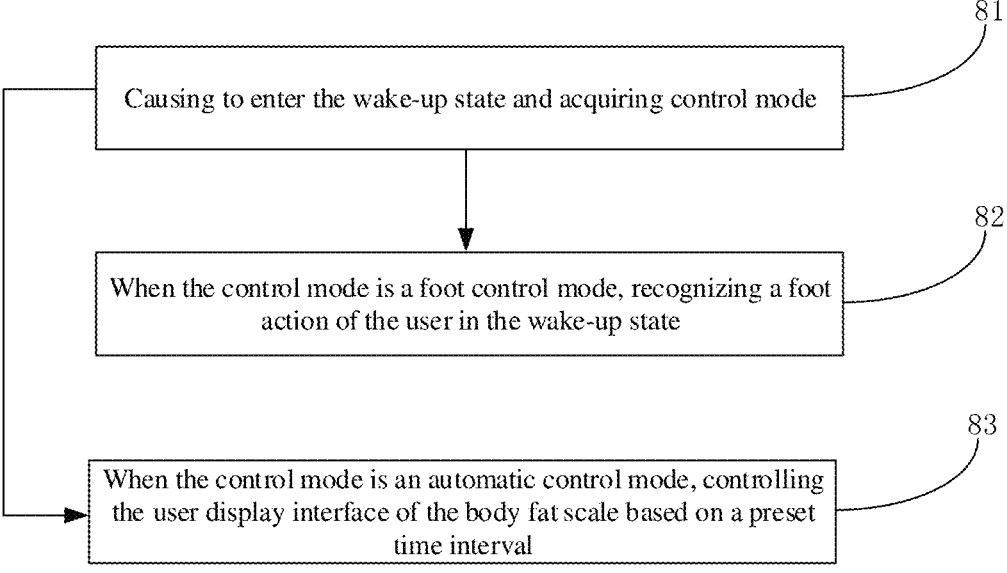
FIG. 8 is a flow diagram of an example provided in the present application for controlling a display interface according to different control modes.

In another example, a user display interface is controlled according to different control modes using a method as shown in FIG. 8, which is a flow diagram of an example of a body fat scale provided in the present application for controlling a display interface according to different control modes. The method of this example comprises steps 81 to 83.

Step 81: Enter the wake-up state and acquire the control mode.

Specifically, the body fat scale enters the wake-up state by the method in step 11, which is not described herein. The control modes are two modes in which the body fat scale controls how the user display interface is displayed, which can be selected by the user in the user display interface.

Step 82: When the control mode is a foot control mode, then the step of recognizing a foot action of the user in the wake-up state is performed.

Specifically, when the current control mode of the body fat scale is a foot control mode, step 11 is performed to identify the user's foot action and control the user display interface of the body fat scale based on the user's foot action, and subsequent steps are performed.

Step 83: When the control mode is an automatic control mode, the user display interface of the body fat scale is controlled based on a preset time interval.

Specifically, when the current control mode of the body fat scale is an automatic control mode, then the user display interface of the body fat scale is switched within a preset time interval, for example, when the preset time interval is 3 s, the current user display interface of the body fat scale is automatically switched to the next user display interface within 3 s.

In an example of the present application, if the body fat scale does not recognize a foot action within the preset time duration, the control display interface automatically performs page switching, for example, by performing the above-described operation on the user display interface. Among them, preset time duration can be set before leaving the factory, or it can be set by the user according to the user's needs, and is not limited herein.

The method of the above example can be implemented using a body fat scale, which is described below in connection with FIG. 9, which is a schematic diagram of the structure of an example of a body fat scale provided by the present application.

Figure 9:
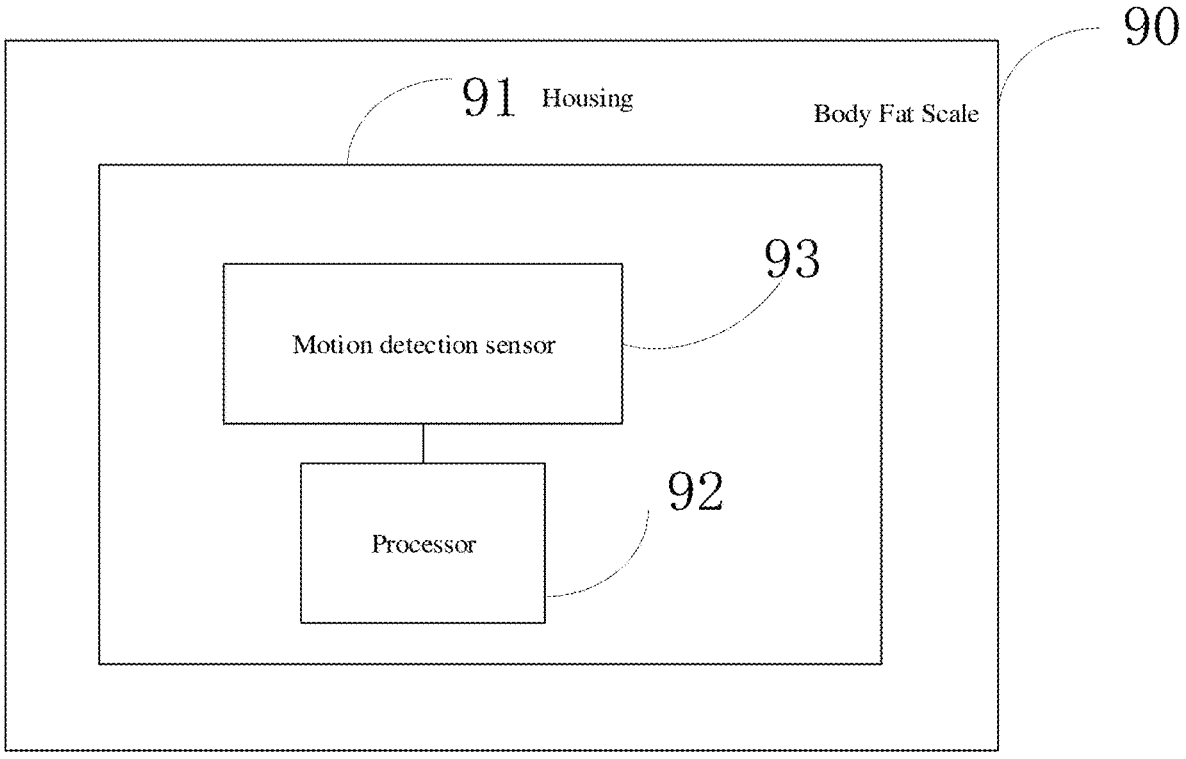
FIG. 9 is a schematic diagram of the structure of a first example of a body fat scale provided in the present application.

As shown in FIG. 9, the body fat scale 90 of the present example includes a housing 91, a processor 92, and a motion detection sensor 93, wherein the housing 91 is provided with a display screen or a projection device, wherein the display screen is used for displaying a user display interface, and the projection device is used for projecting the display user display interface; and the processor 92, which is provided in the housing 91, is used for recognizing the user's foot actions in a wake-up state and controlling the user display interface based on the foot actions displayed on the user display interface of the body fat scale.

Compared to a conventional body fat scale, the body fat scale 90 of the present example recognizes the user's foot actions and thereby controls the body fat scale 90, and can control the user display interface of the body fat scale 90 through the user's foot actions, thereby simplifying the user's control operation of the user display interface of the body fat scale 90, enabling the user to achieve control of the user display interface of the body fat scale 90 without having to download an APP, and thereby being able to simplify the user operation, thereby enabling the user to interact with the body fat scale 90 more conveniently.

Further, the present example is able to avoid unnecessary foot operations by the user by going to recognize the user's foot actions in the wake-up state.

The body fat scale 90 is provided with a display screen, etc., through which the user display interface can be displayed. Alternatively, a projection device may also be provided at the body fat scale 90, and after the body fat scale 90 enters the wake-up mode, the projection device is controlled to project the user display interface on a projection bearing area, such as a floor, a wall, and the like. The display screens may protrude from the scale surface.

Optionally, the body fat scale 90 of the present example further comprises: a motion detection sensor 93, provided in the housing and connected to the processor 92, the motion detection sensor 93 being used to obtain motion information about the user's actions at the body fat scale, and the processor 92 determining the user's foot actions based on the motion information.

Compared to a conventional body fat scale, the weighing surface of the body fat scale 90 of the present example is provided with a motion detection sensor, the motion detection sensor 93 acquires the user's motion information in the body fat scale, and the processor 92 determines the user's foot action based on the motion information, and the user will step on the body fat scale when the user produces a foot action on the scale, causing the body fat scale to vibrate, and the body fat scale of the present example is capable of accurately obtaining the user's motion information in the body fat scale by means of a vibration sensor, and can improve the accuracy of interaction. This example of the body fat scale uses a vibration sensor to accurately obtain information about the user's actions on the body fat scale, which can improve the accuracy of interaction.

In an example of the present application, the motion detection sensor 93 comprises a vibration sensor, the motion information comprises vibration information, and the vibration sensor acquires vibration information of the housing.

Wherein the vibration sensor is a device or element for measuring vibration of an object, and it determines the vibration state of the object by detecting a small displacement or velocity change on the surface of the object due to vibration. When a user produces a foot action on the body fat scale, the user will step on the body fat scale, causing the body fat scale to vibrate, and the body fat scale in this example can accurately obtain information about the user's action on the body fat scale by means of the vibration sensor.

Optionally, the vibration sensor includes one or more of an acceleration sensor, a velocity sensor, a displacement sensor, a force sensor.

Among them, an accelerometer is a sensor that detects vibrations by measuring the acceleration of an object. Acceleration sensors are usually made of MEMS and their operating principle is based on Newton's second law. When an object vibrates, the acceleration sensor measures the acceleration of the object to calculate the characteristic parameters of the object's vibration, i.e., the vibration information.

A speed sensor is a sensor that measures the speed at which an object is moving, and it detects and measures the speed at which the object is moving, converting it into an electrical signal. The speed sensor will generate an electromagnetic induction through an electromagnetic coil, this electromagnetic induction changes when the object vibrates, thus measuring the vibration information of the object based on the changing electromagnetic induction.

Displacement sensors, also known as linear sensors, are linear devices belonging to metal induction, and the role of the sensor is to convert various measured physical quantities into electrical quantities. For example, the potentiometer displacement sensor, it through the potentiometer element will object mechanical displacement (such as scale vibration displacement) into a linear or arbitrary function of the resistance or voltage output, so as to measure the vibration of the object information.

The force transducer consists of four strain gauges that form a Wheatstone bridge. As the strain gauges are firmly adhered to the elastomer, the strain gauges will deform in the same way as the elastomer, and the small volume force transducer is customized, which results in a change in resistance, and the output signal from the Wheatstone bridge will provide information about these deformations, which will allow the magnitude of the force acting on the strain gauges to be calculated, and therefore measure the vibration information of the object.

Vibration sensors can also be piezoelectric vibration sensors, which can convert the mechanical vibration of an object into an electrical signal for vibration detection and measurement.

In an example of the present application, the body fat scale 90 is provided with a foot action region and a display region, the user display interface is displayed in the display region, and the foot action detection sensor 93 is provided in the foot action region, wherein the foot action region does not overlap with the display region.

Through the differentiated setting of the foot action area and the display area, not only can the visual interference of the foot on the user display interface be reduced so as to improve the accuracy of the control of the user display interface, but also to prevent the occurrence of situations such as the blocking of the foot leading to the user not being able to see the data information on the user display interface.

Optionally, the foot action region comprises an optimal foot region, the spacing or distance between the left side of the optimal foot region and the left side of the housing 91 and the spacing or distance between the right side of the optimal foot region and the right side of the housing 91 being greater than a spacing threshold or distance threshold; and the difference in spacing or distance between the left side of the optimal foot region and the right side of the optimal foot region and the spacing between the feet spaced apart when the user is naturally standing being less than the spacing or distance threshold; wherein the region sensitivity of the optimal foot region is greater than the region sensitivity of the other foot action regions thereof with.

The region sensitivity is a threshold value of the amount of vibration change for the region to be recognized as a foot action after receiving the vibration information. The optimal foot region of the foot action region has the highest region sensitivity, so that the foot action acquired by the body fat scale when the user naturally stands on the body fat scale is the most accurate foot action, and the foot action performed by the user in the optimal foot region can be accurately and quickly recognized by the body fat scale. The motion detection sensor 93 may be provided in correspondence with the optimal foot region.

In this case, both the display area and the foot action area are on the user-facing side of the housing 91, and these two areas may be coplanar or have a certain height difference.

Figure 10:
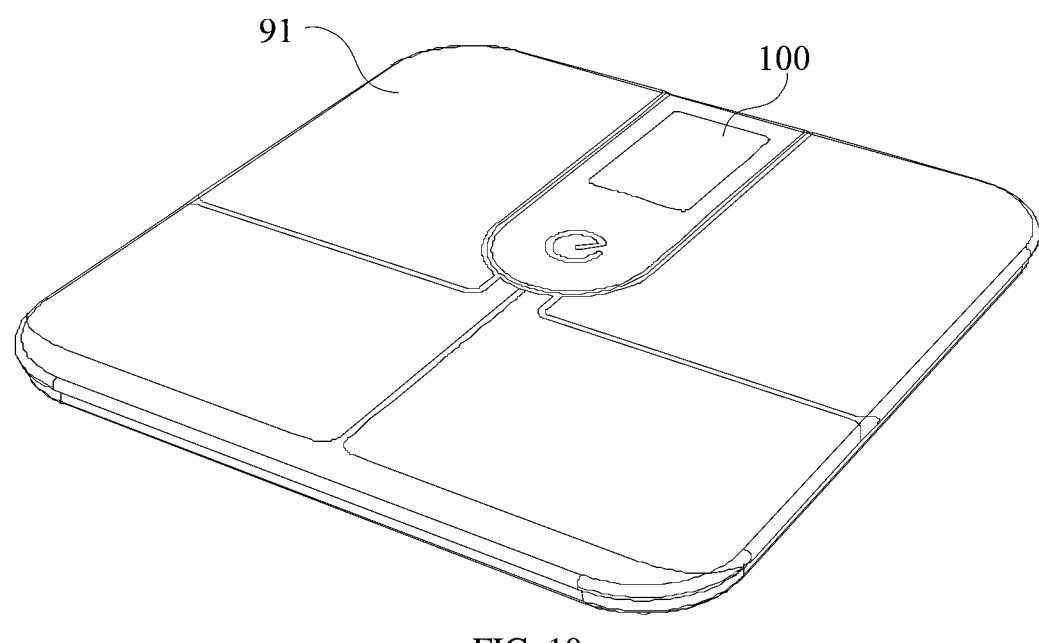
FIG. 10 is a schematic diagram of a three-dimensional structure of a second example of a body fat scale provided in the present application.
Figure 11:
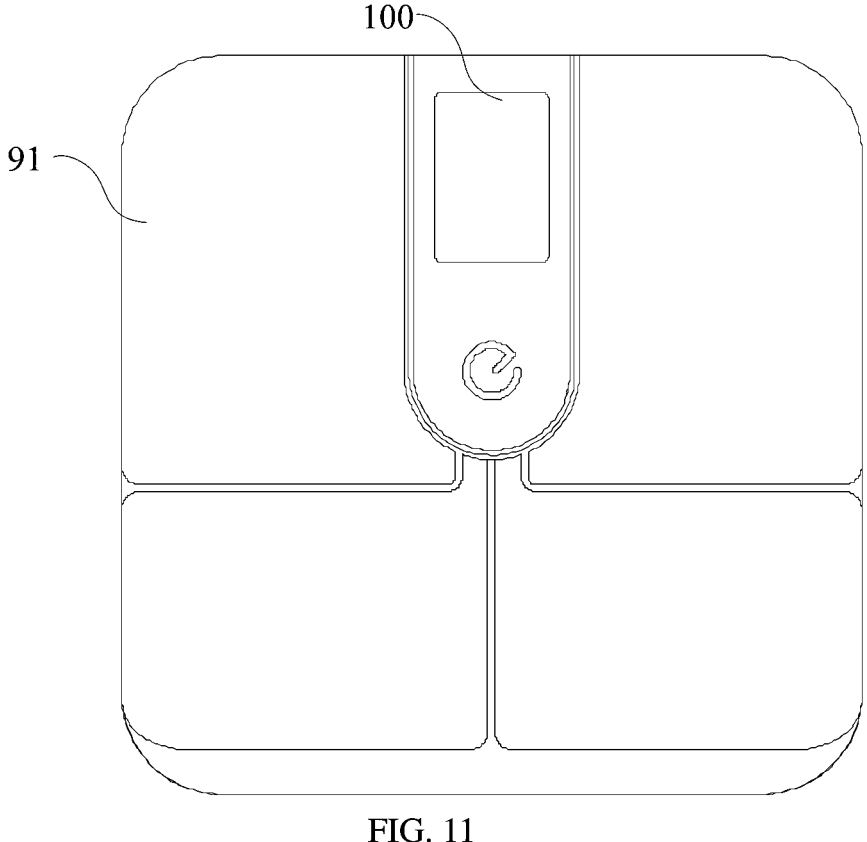
FIG. 11 is a top view schematic of the example of FIG. 10.
Figure 12:
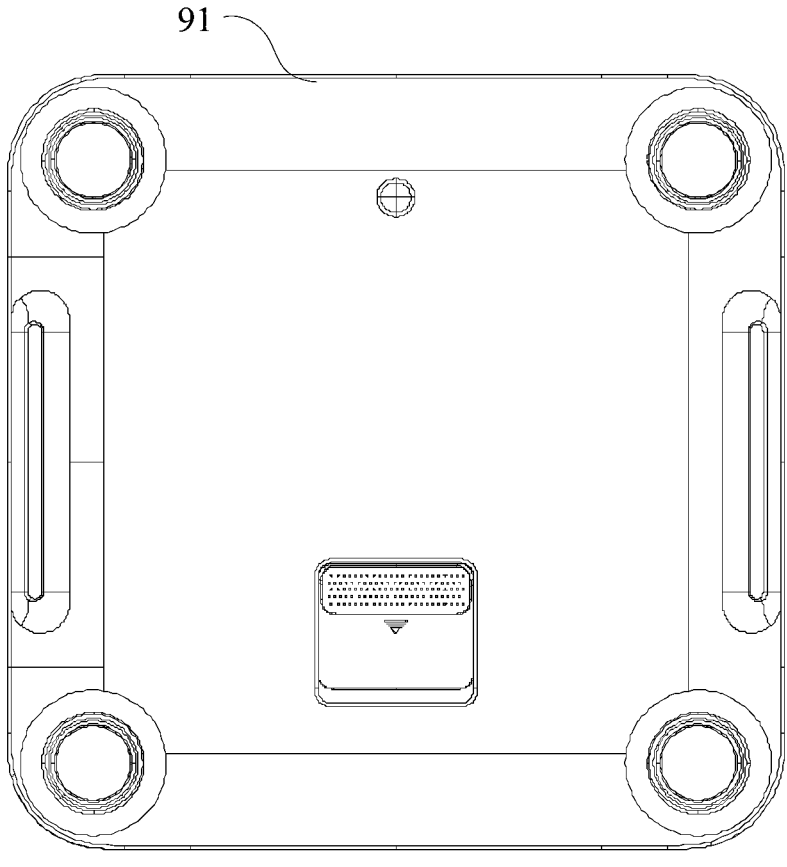
FIG. 12 is an elevation schematic view of the example of FIG. 10.

In another example, as shown in FIGS. 10 to 12, FIG. 10 is a schematic diagram of a three-dimensional structure of a second example of a body fat scale provided in the present application; FIG. 11 is a top view schematic diagram of the example of FIG. 10; and FIG. 12 is an elevation view schematic diagram of the example of FIG. 10. The display 111 is provided in the middle front of the housing 91, and other positions may be provided as a foot action area, and the downward-facing side of the housing 91 may be provided with a bracket and a battery box and the like.

The above is only an implementation of this application, and is not intended to limit the patent scope of this application. Any equivalent structure or equivalent process transformation using the contents of the specification of this application and the accompanying drawings, or directly or indirectly applied in other related technical fields, are all included in the scope of patent protection of this application.

What is claimed is:

1. A method for controlling a user display interface of a body fat scale, comprising:

obtaining, by a vibrator sensor coupled with the body fat scale, vibration information comprising a vibration change amount associated with a user;

recognizing, based on a determination that the vibration change amount is greater than or equal to a vibration sensitivity value, a foot action of the user in a wake-up state of the body fat scale;

determining that the foot action is a single click action or a combo click action based on a number of footsteps within a predetermined time duration; and controlling the user display interface of the body fat scale based on the foot action.

2. The method according to claim 1, wherein the body fat scale is provided with a motion detection sensor, and wherein recognizing the foot action of the user comprises:

obtaining, by the motion detection sensor, motion information about the foot action of the user; and identifying the foot action of the user based on the motion information.

3. The method according to claim 1, wherein recognizing the foot action of the user comprises:

determining, based on the vibration change amount, a type of the foot action.

4. The method according to claim 3, wherein determining the type of the foot action comprises:

after determining that the type of the foot action is the single click action, controlling the user display interface to switch a first option to a second option; and after determining that the type of the foot action is the combo click action, controlling the user display interface to confirm an option displayed in the user display interface.

5. The method according to claim 3, wherein the determining the type of the foot action comprises:

after determining a length of an interval duration between two adjacent foot actions is less than or equal to an interval threshold, determining that the type of the foot action corresponds to the combo click action.

6. The method according to claim 3, wherein the determining the type of the foot action comprises:

obtaining a duration of sustained heavy pressing of the foot action; and determining whether the type of the foot action is a long press action or a short press action based on the duration of sustained heavy pressing.

7. The method according to claim 3, wherein the determining the type of the foot action comprises:

obtaining an action region where the foot action is generated; and determining the type of the foot action as a left foot action and/or a right foot action based on the action region.

8. The method according to claim 1, wherein controlling the user display interface comprises at least one of: determining a current page in the user display interface, providing a switching option on the current page in the user display interface, and preforming a page switching operation on the user display interface.

9. The method according to claim 1, wherein display content of the user display interface comprises at least one of following:

detection result charts of body fat, body weight, and muscle weight;

corresponding graphs of the body fat, the body weight, and the muscle weight;

comparison graphs of any two or more of the body fat, the body weight, and the muscle weight; and user information.

10. The method according to claim 8, further comprising:

after determining that the foot action is not recognized within a preset time period, controlling the user display interface to automatically perform page switching.

11. The method according to claim 1, further comprising:

prior to recognizing the foot action, causing the body fat scale to enter the wake-up state; and determining a control mode in the wake-up state;

after determining that the control mode is a foot control mode, recognizing the foot action in the wake-up state; and after determining the control mode is an automatic control mode, controlling the user display interface of the body fat scale based on a preset time interval.

12. The method according to claim 1, further comprising:

prior to recognizing the foot action, determining that the body fat scale has entered the wake-up state based on a detection that the user is standing with both feet on the body fat scale.

13. The method according to claim 12, wherein detecting that the user is standing with the both feet on the body fat scale comprises:

obtaining an amount of weight change associated with the user; and in response to the amount of weight change being within a predetermined range, determining that the user is standing with the both feet on the body fat scale.

14. The method according to claim 1, wherein the recognizing the foot action of the user in the wake-up state comprises:

prior to recognizing the foot action, causing the body fat scale to enter the wake-up state and activating the user display interface; and recognizing the foot action of the user while the user display interface is in a display state.

15. A body fat scale comprising:

a housing, provided with a display or a projection device, the display configured for displaying a user display interface, the projection device configured for projecting the user display interface, a processor provided in the housing, and a vibration sensor that is provided in the housing and coupled to the processor, wherein the processor is configured for:

obtaining, by the vibrator sensor, vibration information comprising a vibration change amount associated with a user;

recognizing, based on a determination that the vibration change amount is greater than or equal to a vibration sensitivity value, a foot action of the user in a wake-up state of the body fat scale;

determining that the foot action is a single click action or a combo click action based on a number of footsteps within a predetermined time duration; and controlling the user display interface based on the foot action.

16. The body fat scale according to claim 15, further comprising:

a motion detection sensor, provided in the housing and coupled to the processor, the motion detection sensor configured to obtain motion information about the foot action of the user in the housing, the processor configured for determining the foot action of the user based on the motion information.

17. The body fat scale according to claim 15, wherein the vibration sensor comprises one or more of an acceleration sensor, a velocity sensor, a displacement sensor, and a force sensor.

18. The body fat scale according to claim 16, wherein the housing is provided with a foot action region and a display region, the user display interface being displayed in the display region, and the motion detection sensor being provided in the foot action region, and wherein the foot action region does not overlap with the display region.

19. The body fat scale according to claim 18, wherein the foot action region comprises an optimal foot region, wherein a distance between a left side edge of the optimal foot region and a left side edge of the housing, and a distance between a right side edge of the optimal foot region and a right side edge of the housing are greater than a distance threshold;

wherein a difference in a distance between the left side edge of the optimal foot region and the right side edge of the optimal foot region and a difference in a distance between user's feet when the user is standing naturally are less than the distance threshold; and wherein a regional sensitivity of the optimal foot region is greater than a regional sensitivity of other regions of the foot action region.

20. An Apparatus comprising:

a processor, and a memory in communication with the processor and storing instructions that, when executed by the processor, cause the apparatus to:

obtain, by a vibrator sensor coupled with a body fat scale, vibration information comprising a vibration change amount associated with a user;

recognize, based on a determination that the vibration change amount is greater than or equal to a vibration sensitivity value, a foot action of the user in a wake-up state of the body fat scale;

determine that the foot action is a single click action or a combo click action based on a number of footsteps within a predetermined time duration; and control a user display interface of the body fat scale based on the foot action.

21. The apparatus according to claim 20, wherein the instructions, when executed by the processor, further cause the apparatus to:

obtain an amount of weight change associated with the user; and in response to the amount of weight change being within a predetermined range, determine that the user is standing with both feet on the body fat scale.

* * * * *